(12) United States Patent
Kubo

(10) Patent No.: US 11,618,503 B2
(45) Date of Patent: Apr. 4, 2023

(54) TRAVEL CONTROL SYSTEM

(71) Applicant: HONDA MOTOR CO., LTD., Tokyo (JP)

(72) Inventor: Takashi Kubo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 17/207,813

(22) Filed: Mar. 22, 2021

(65) Prior Publication Data

US 2021/0300469 A1 Sep. 30, 2021
US 2022/0194470 A9 Jun. 23, 2022

(30) Foreign Application Priority Data

Mar. 26, 2020 (JP) .............................. JP2020-056694

(51) Int. Cl.
*B62D 15/02* (2006.01)
*G06V 20/56* (2022.01)

(52) U.S. Cl.
CPC ......... *B62D 15/025* (2013.01); *G06V 20/588* (2022.01)

(58) Field of Classification Search
CPC .......................... B60W 2710/20; G06V 20/588
See application file for complete search history.

(56) References Cited

U.S. PATENT DOCUMENTS

| | | | |
|---|---|---|---|
| 10,099,689 B2 | 10/2018 | Wada et al. | |
| 2015/0274163 A1 | 10/2015 | Terazawa | |
| 2016/0229399 A1* | 8/2016 | Wada | B60W 50/0097 |
| 2017/0336515 A1* | 11/2017 | Hosoya | G01S 19/49 |
| 2019/0009819 A1* | 1/2019 | Ishioka | B60W 40/06 |
| 2021/0042945 A1* | 2/2021 | Matsuo | G06T 7/593 |
| 2021/0171035 A1* | 6/2021 | Takahama | B62D 6/002 |

FOREIGN PATENT DOCUMENTS

| | | | | |
|---|---|---|---|---|
| DE | 102012214206 B4 * | 12/2022 | ............ | B60W 10/06 |
| JP | 2015194946 A | 11/2015 | | |
| JP | 2016147541 A | 8/2016 | | |
| JP | 2020029140 A | 2/2020 | | |

OTHER PUBLICATIONS

Notice of Reasons for Refusal for Patent Application JP2020-056694; 6 pp.

* cited by examiner

*Primary Examiner* — Jeff A Burke
*Assistant Examiner* — Jerrod Irvin Davis
(74) *Attorney, Agent, or Firm* — Armstrong Teasdale LLP

(57) ABSTRACT

A travel control system for a vehicle equipped with a steering device includes: an imaging device for acquiring images in front of the vehicle; a vehicle speed sensor; and a control device configured to control the steering device. The control device includes: a travel lane detection unit configured to recognize a lane shape of a travel lane on which the vehicle is currently traveling from the images acquired by the imaging device; a lane keeping planning unit configured to set a steering timing for steering the vehicle such that the vehicle travels on the recognized travel lane; and a lane keeping execution unit configured to control the steering device to steer the vehicle at the steering timing set by the lane keeping planning unit, the lane keeping planning unit being configured to change the steering timing based on the recognized lane shape and the detected vehicle speed.

5 Claims, 3 Drawing Sheets

TRAVEL CONTROL SYSTEM

TECHNICAL FIELD

The present invention relates to a travel control system configured to control travel of a vehicle, and particularly to a travel control system configured to perform lane keeping control to make a vehicle travel along a travel lane.

BACKGROUND ART

A vehicle travel support system that performs vehicle travel support during a turn along a curve is known (for example, JP2016-147541A). The vehicle travel support system disclosed in JP2016-147541A generates a steering assist force prior to entry to a curve to assist lane keeping and avoiding departure from the lane. The vehicle travel support system disclosed in this prior art document determines a delay of the timing of steering performed by the driver (actual steering timing) from a reference steering timing set with reference to the start point of the curve, and advance the timing of starting the steering assist force prior to entry to the curve according to the delay of the actual steering timing.

When an autonomously traveling vehicle enters a curved section from a straight section of a lane, steering is started based on images acquired by a camera. The timing at which the steering is started (hereinafter, steering timing) is set based on the images acquired by the camera. However, since the mount position of the camera generally does not coincide with the position of the yaw rotation axis of the vehicle, performing the steering at the steering timing set based on the images acquired by the camera may cause the vehicle to wobble.

SUMMARY OF THE INVENTION

In view of the foregoing background, an object of the present invention is to provide a travel control system for a vehicle equipped with a steering device which can set the steering timing properly.

To achieve the above object, one embodiment of the present invention provides a travel control system (1) for a vehicle (2) equipped with a steering device (3C), the travel control system comprising: an imaging device (4) configured to acquire images in front of a vehicle body of the vehicle; a vehicle speed sensor (5) configured to detect a vehicle speed of the vehicle; and a control device (7) configured to control the steering device, wherein the control device comprises: a travel lane detection unit (7A) configured to recognize a lane shape of a travel lane (D) on which the vehicle is currently traveling from the images acquired by the imaging device; a lane keeping planning unit (7B) configured to set a steering timing for steering the vehicle such that the vehicle travels on the recognized travel lane; and a lane keeping execution unit (7C) configured to control the steering device to steer the vehicle at the steering timing set by the lane keeping planning unit, the lane keeping planning unit being configured to change the steering timing based on the recognized lane shape and the detected vehicle speed.

According to this configuration, the steering timing is determined in accordance with the lane shape of the travel lane. Therefore, when the vehicle traveling straight enters a curved section, it is possible to change the steering timing. Thereby, when the vehicle enters a curved section, the steering timing can be set properly by taking into account that the position where the imaging device is mounted differs from the position of the yaw rotation axis, whereby wobbling of the vehicle can be prevented.

In the above configuration, preferably, the lane keeping planning unit is configured to set the steering timing such that a position in the vehicle where the imaging device is mounted passes a center of the travel lane.

According to this configuration, setting of the magnitude of the steering angle, the vehicle speed, and the like becomes easy.

In the above configuration, preferably, the imaging device is positioned forward of a yaw rotation axis (X) of the vehicle body, and when the vehicle enters a curved section of the travel lane, the lane keeping planning unit delays the steering timing by a prescribed delay time ($\tau$) compared to when the vehicle enters a straight section of the travel lane.

According to this configuration, when the vehicle enters a curved section of the travel lane, the steering timing can be set to correspond to the position of the yaw rotation axis, and this helps prevent the vehicle from wobbling. On the other hand, when the vehicle enters a straight section, the responsiveness of the vehicle can be enhanced.

In the above configuration, preferably, the lane keeping planning unit is configured to increase the delay time as a fore and aft distance (L) between the position where the imaging device is mounted and a yaw rotation axis (X) of the vehicle body increases.

According to this configuration, the steering timing can be set to correspond to the position of the yaw rotation axis, and this contributes to preventing the vehicle from wobbling.

In the above configuration, preferably, the lane keeping planning unit is configured to set the delay time at a value obtained by dividing the fore and aft distance between the position where the imaging device is mounted and the yaw rotation axis by the vehicle speed detected by the vehicle speed sensor.

According to this configuration, the steering timing can be set to correspond to the position of the yaw rotation axis, and this contributes to preventing the vehicle from wobbling.

In the above configuration, preferably, the lane keeping planning unit is configured to determine that the vehicle enters the curved section when an angle formed between a direction of the travel lane at the position where the imaging device is mounted and a forward direction of the vehicle is greater than or equal to a threshold value.

According to this configuration, it is possible to easily determine whether the vehicle enters the curved section.

According to the foregoing configuration, it is possible to provide a travel control system for a vehicle equipped with a steering device which can set the steering timing properly.

DESCRIPTION OF THE PREFERRED EMBODIMENT(S)

In the following, an embodiment of the present invention will be described in detail with reference to the drawings.

First Embodiment

Figure 1:
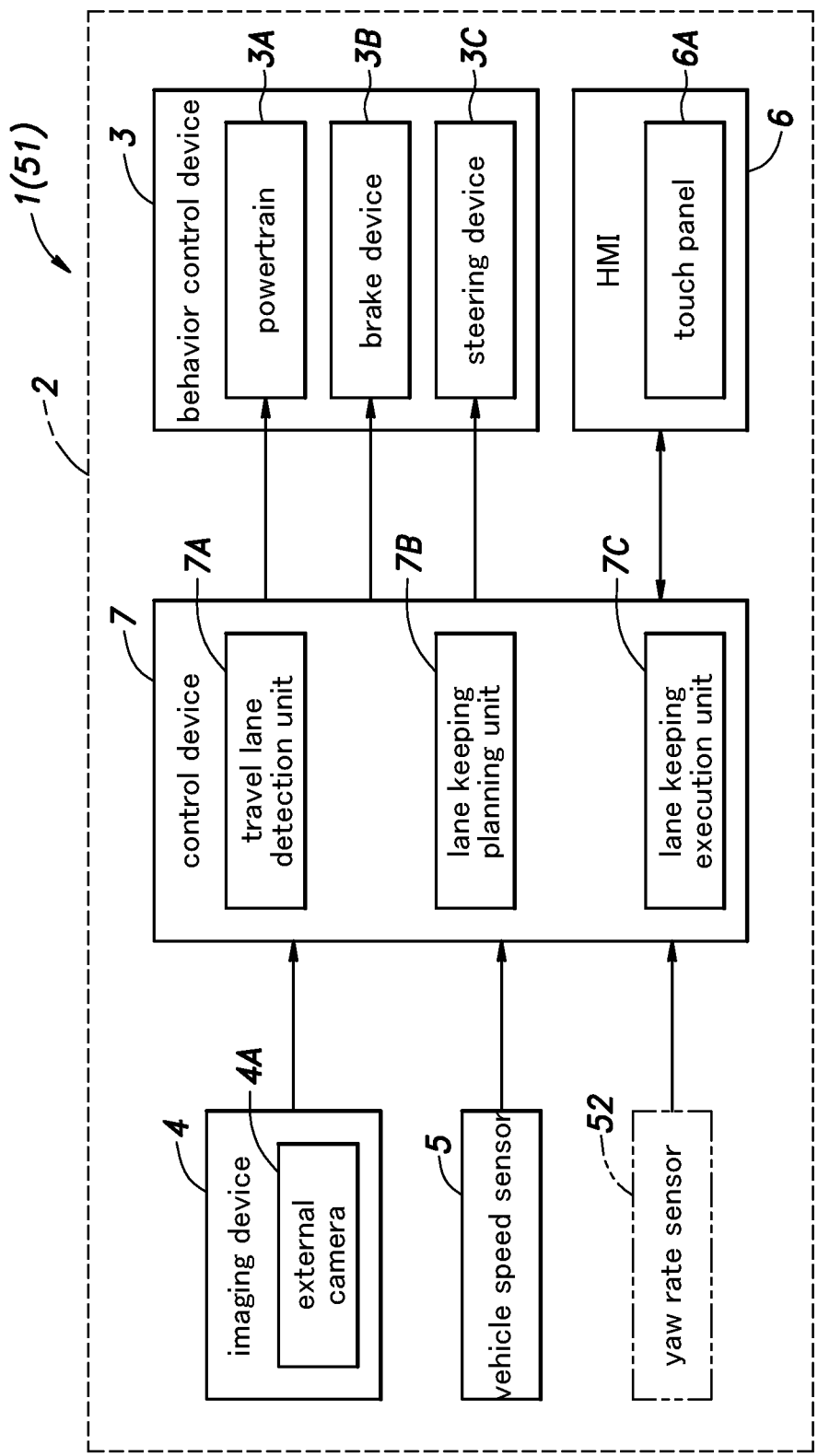
FIG. 1 is a functional block diagram of a travel control system according to an embodiment of the present invention.

A travel control system 1 is installed in a vehicle 2 such as an automobile (see FIG. 2) to enable the vehicle 2 to autonomously travel along a travel lane D. As shown in FIG. 1, the travel control system 1 includes a behavior control device 3, an imaging device 4, a vehicle speed sensor 5, a human machine interface (HMI) 6, and a control device 7. The above components of the travel control system 1 are connected to each other so that signals can be transmitted therebetween via a communication means such as a Controller Area Network (CAN).

The behavior control device 3 is a device for controlling the behavior of the vehicle 2 by accelerating, decelerating, and steering the vehicle 2, and includes a powertrain 3A, a brake device 3B, and a steering device 3C. The powertrain 3A is a device configured to apply a driving force to the vehicle 2. The powertrain 3A includes a power source and a transmission, for example. The power source includes at least one of an internal combustion engine, such as a gasoline engine and a diesel engine, and an electric motor. The brake device 3B is a device configured to apply a brake force to the vehicle 2. For example, the brake device 3B includes a brake caliper configured to press a brake pad against a brake rotor and an electric cylinder configured to supply an oil pressure to the brake caliper to control the driving of the brake caliper. The brake device 3B may include an electric parking brake device configured to restrict rotations of wheels via wire cables.

The steering device 3C is a device for changing a steering angle of the wheels. For example, the steering device 3C includes a rack-and-pinion mechanism configured to steer (turn) the wheels and an electric motor configured to drive the rack-and-pinion mechanism. The powertrain 3A, the brake device 3B, and the steering device 3C are controlled by the control device 7.

The imaging device 4 serves as an external environment information acquisition device for detecting electromagnetic waves (such as visible light), sound waves, and the like from the surroundings of the vehicle 2 to acquire images in front of the vehicle body of the vehicle 2. The imaging device 4 includes an external camera 4A and outputs the acquired images to the control device 7.

The external camera 4A is a device configured to capture images in front of and on lateral sides of the vehicle 2, and consists of a digital camera using a solid imaging element such as a CCD or a CMOS, for example. The external camera 4A is fixed in the vehicle cabin such that the camera optical axis thereof is directed in the forward direction of the vehicle body.

Note that the imaging device 4 may include a sonar, a millimeter wave radar, and/or a laser lidar instead of or in addition to the external camera 4A. The sonar, the millimeter wave radar, and the laser lidar respectively emit ultrasonic waves, millimeter waves, and laser in the forward and lateral directions of the vehicle 2 and capture the reflected waves to acquire the images in front of and on lateral sides the vehicle 2. The imaging device 4 may include multiple sonars, multiple millimeter wave radars, and/or multiple laser lidars arranged to jointly acquire the images in front of and on lateral sides of the vehicle 2.

Figure 2:
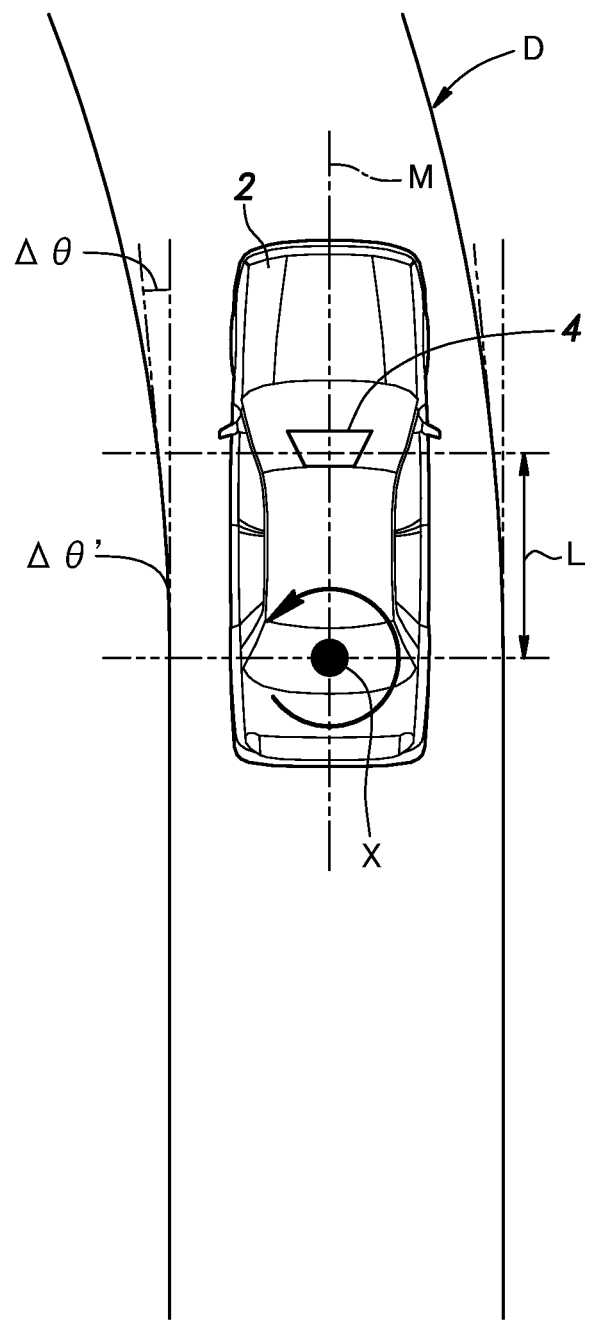
FIG. 2 is an explanatory diagram for explaining the position of an imaging device and the position of the yaw rotation axis in a vehicle.

As shown in FIG. 2, the imaging device 4 is arranged in a front portion of the vehicle 2 on a vehicle center line M. In the present embodiment, the imaging device 4 consists of an external camera 4A and is fixed to the vehicle body to be close to an upper portion of the windshield inside the vehicle cabin. Since the yaw rotation axis X of the vehicle 2 passes the center of gravity of the vehicle 2, the imaging device 4 is positioned forward of the yaw rotation axis X with respect to the vehicle body. Also, because the imaging device 4 is positioned on the vehicle center line M, the imaging device 4 and the yaw rotation axis X are arranged in the fore and aft direction along the vehicle center line M. However, the arrangement of the imaging device 4 and the yaw rotation axis X is not limited to this arrangement, and the imaging device 4 and the yaw rotation axis X may be provided at positions that are offset not only in the fore and aft direction of the vehicle body but also in the lateral direction. Note that the yaw rotation axis X here is an axis extending in the vertical direction and serves as a rotation axis of the yawing motion (see the arrow in FIG. 2) of the vehicle body.

The vehicle speed sensor 5 is a sensor configured to detect the speed of the vehicle 2. The vehicle speed sensor 5 may be any known speed sensor. For example, the vehicle speed sensor 5 may be of a type using a magnetic sensor, which includes a magnet provided on a wheel of the vehicle and a magnetic sensor (Hall sensor) for detecting a change in the magnetic field due to rotation of the wheel.

The HMI 6 is an input/output device for receiving an input operation by the occupant and notifying the occupant of various kinds of information by display and/or voice. The HMI 6 includes, for example, a touch panel 6A that includes a display screen such as a liquid crystal display or an organic EL display and is configured to receive the input operation by the occupant. The HMI 6 also includes various switches configured to receive the input operation by the occupant.

The control device 7 consists of an electronic control unit (ECU) that includes a CPU, a nonvolatile memory such as a ROM, a volatile memory such as a RAM, and the like. The CPU executes operation processing according to a program so that the control device 7 executes various types of vehicle control. The control device 7 may consist of one piece of hardware, or may consist of a unit including multiple pieces of hardware. Further, as a result of execution of the program by the hardware constituting the control device 7, such as an LSI, an ASIC, or an FPGA, various functional units each performing a prescribed function are configured in the control device 7.

The control device 7 determines the travel lane D on which the vehicle 2 should travel based on the images acquired by the imaging device 4 and controls the powertrain 3A, the brake device 3B, and the steering device 3C based on the vehicle speed acquired by the vehicle speed sensor 5 and the images acquired by the imaging device 4, such that the vehicle 2 autonomously travels along the travel lane D. To perform such control, the control device 7 includes, as functional units thereof, a travel lane detection unit 7A, a lane keeping planning unit 7B, and a lane keeping execution unit 7C, as shown in FIG. 1.

The travel lane detection unit 7A extracts road markings (such as white lines), road boundaries, etc. in the images acquired by the imaging device 4, and detects the shape of the travel lane D on the side and ahead of the vehicle body. The travel lane detection unit 7A is preferably configured to detect the travel lane D within a range that has a semicircular shape with the position where the imaging device 4 is mounted being the center of the semicircle and, in top view, covers at least a region within the radius of five meters from the front end of the vehicle 2.

The lane keeping planning unit 7B executes a setting process to calculate a delay time $\tau$ and driving parameters used to execute a lane keeping process for making the vehicle 2 travel to keep near the center of the travel lane D when there is a prescribed input to the HMI. In the setting process, the lane keeping planning unit 7B calculates, based on the shape of the travel lane D detected by the travel lane detection unit 7A, a target point to pass to make the vehicle 2 travel on the center of the travel lane D and driving parameters necessary to make the vehicle 2 travel to the target point. The driving parameters include, for example, information of the vehicle speed and the magnitude of the steering angle to be set. Note that the lane keeping planning unit 7B calculates the driving parameters including the steering angle and the vehicle speed such that the position where the imaging device 4 is mounted passes the target point. In the present embodiment, the target point is set to a position at a distance of approximately two meters from the front end center of the vehicle body. The lane keeping planning unit 7B executes the setting process to calculate the delay time τ and the driving parameters and outputs the driving parameters to the lane keeping execution unit 7C after the delay time τ from immediately after the calculation.

When the driving parameters are input from the lane keeping planning unit 7B, the lane keeping execution unit 7C controls the steering device 3C, the powertrain 3A, and the brake device 3B promptly in accordance with the driving parameters. Namely, steering is performed at a time after the delay time τ from the calculation of the delay time τ and the driving parameters. Thus, in the present embodiment, the steering timing is delayed by the delay time τ from the calculation of the delay time τ and the driving parameters.

Figure 3:
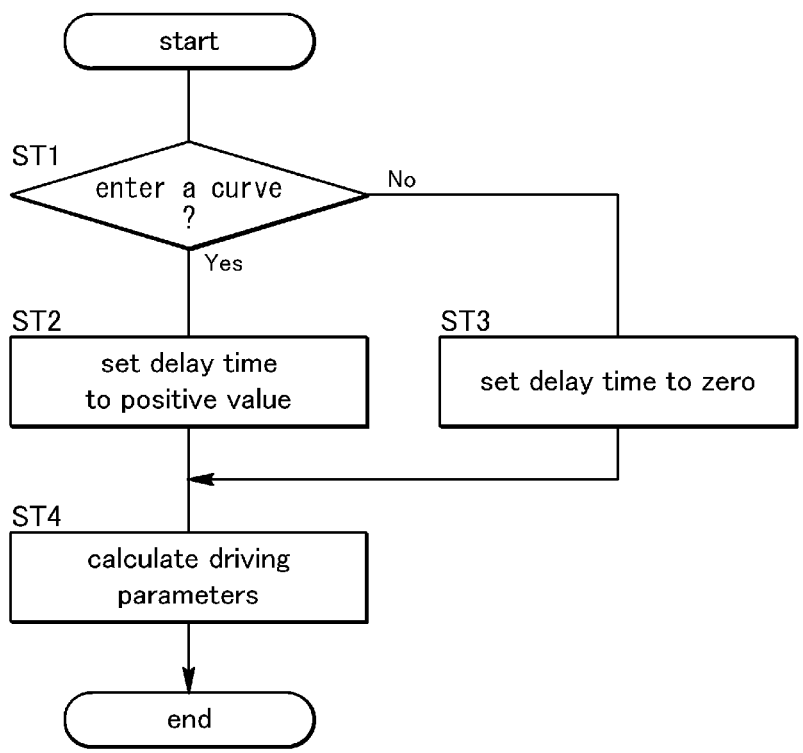
FIG. 3 is a flowchart showing a setting process.

Next, details of the setting process will be described with reference to the flowchart of FIG. 3. Here, it is assumed that the setting process is started when the vehicle 2 is traveling on a straight travel lane D. Also, the setting process is performed in a sufficiently short period of time, and thus, movement of the vehicle 2 during the setting process can be ignored.

In the first step ST1 of the setting process, the lane keeping planning unit 7B acquires the shape of the travel lane D on which the vehicle 2 is traveling from the travel lane detection unit 7A, which detects the shape of the travel lane D based on the images acquired by the imaging device 4. Thereafter, the lane keeping planning unit 7B determines whether the vehicle 2 enters a curved section. More specifically, the lane keeping planning unit 7B first acquires the direction of the travel lane D at the position where the imaging device 4 (external camera 4A) is mounted based on the shape of the travel lane D detected by the travel lane detection unit 7A. Here, the direction of the travel lane D at the position where the imaging device 4 (external camera 4A) is mounted refers to the direction (extension direction) of a tangent line to the center of the travel lane D at the position where the imaging device 4 (external camera 4A) is mounted. Subsequently, the lane keeping planning unit 7B calculates an angle Δθ (see FIG. 2) formed between the acquired direction of the travel lane D and the forward direction of the vehicle body. In a case where the calculated angle Δθ has increased to be equal to or greater than a prescribed threshold value, the lane keeping planning unit 7B determines that the vehicle 2 is entering or has entered a curved section and executes step ST2. Otherwise, the lane keeping planning unit 7B executes step ST3.

In step ST2, the lane keeping planning unit 7B acquires the vehicle speed v from the vehicle speed sensor 5. Subsequently, the lane keeping planning unit 7B calculates the delay time τ by dividing the distance L between the imaging device 4 and the yaw rotation axis X in the fore and aft direction of the vehicle body (see FIG. 2) by the vehicle speed v (delay time τ=L/v). Thereby, the delay time τ is set to a positive value depending on the vehicle speed v. Upon completion of calculation of the delay time τ, the lane keeping planning unit 7B executes step ST4.

In step ST3, the lane keeping planning unit 7B sets the delay time τ to zero. When the setting of the delay time τ is completed, the lane keeping planning unit 7B executes step ST4.

In step ST4, the lane keeping planning unit 7B calculates, based on the shape of the travel lane D acquired in step ST1, the driving parameters including the steering angle and the vehicle speed to be set to cause the position where the imaging device 4 is mounted to move to the target point. When the calculation of the driving parameters is completed, the lane keeping planning unit 7B ends the setting process, and outputs the driving parameters to the lane keeping execution unit 7C after the delay time τ.

Next, advantages of the travel control system 1 configured as above will be described. The position where the imaging device 4 is mounted is more forward than the yaw rotation axis X. Therefore, the steering timing calculated at the position of the imaging device 4 (namely, the steering timing calculated based on the images acquired by the imaging device 4) is advanced than the steering timing that should be calculated at the position of the yaw rotation axis X by the time obtained by dividing the distance L between the imaging device 4 and the yaw rotation axis X in the fore and aft direction of the vehicle body by the vehicle speed v.

In the present embodiment, when the vehicle 2 is traveling on a straight travel lane D and it is determined that the vehicle 2 is going to enter the curved section (ST1: Yes), the lane keeping planning unit 7B sets the delay time τ to a positive value (step ST2). Thereby, the steering timing calculated at the position of the imaging device 4 can be delayed.

As shown in FIG. 2, when the vehicle 2 enters the curved section of the travel lane D from the straight section of the same, the imaging device 4 enters the curved section earlier than the yaw rotation axis X does. When the delay time is zero, steering of the vehicle 2 is started immediately after the imaging device 4 has entered the curved section. In contrast, by setting the positive delay time τ, it is possible to delay the timing at which the steering is started, so that the timing at which the steering is started can be brought close to the timing at which the yaw rotation axis X enters the curved section. Thereby, the movement trajectory of the yaw rotation axis X can be brought closer to the center of the travel lane D.

In this way, by setting the delay time τ to a positive value, it is possible to set the steering timing properly by taking into account that the position where the imaging device 4 is mounted differs from the position of the yaw rotation axis X. Therefore, the deviation of the vehicle 2 from the center of the travel lane D and wobbling of the vehicle posture can be prevented or reduced.

Further, in the above embodiment, the delay time τ is preferably set to a value obtained by dividing the distance L between the imaging device 4 and the yaw rotation axis X in the fore and aft direction of the vehicle body by the vehicle speed v. Thereby, by delaying the steering timing by the delay time τ, it is possible to make the steering timing correspond to the position of the yaw rotation axis X.

The lane keeping planning unit 7B sets the driving parameters based on the images acquired by the imaging device 4 so as to cause the position where the imaging device 4 is mounted to move to the target point (ST4). By thus determining the driving parameters, the driving parameters can be set easily compared to a case where the driving parameters are determined to cause another part of the vehicle body to move to the target point because in the present embodiment, no correction based on the positional relationship between the imaging device 4 and the other part of the vehicle body is necessary.

In the lane keeping process, when it is determined in step ST1 that the vehicle 2 traveling a straight lane is going to enter a curved section, the lane keeping planning unit 7B sets the delay time τ to a positive value in step ST2. Thereby, it is possible to set the steering timing by taking into account that the position where the imaging device 4 is mounted differs from the position of the yaw rotation axis X, whereby wobbling of the vehicle 2 can be prevented.

On the other hand, when the vehicle 2 is traveling straight along a straight lane and the lane keeping control is performed to maintain the straight travel, the delay time τ is set to zero so that the driving parameters are output to the lane keeping execution unit 7C immediately after the calculation. Thereby, the responsiveness of the vehicle 2 can be enhanced.

The lane keeping planning unit 7B determines that the vehicle 2 enters a curved section when the angle Δθ formed between the direction of the travel lane D at the position where the imaging device 4 (external camera 4A) is mounted and the forward direction of the vehicle body of the vehicle 2 is greater than or equal to the threshold value (ST1). By thus using the angle Δθ formed between the direction of the travel lane D at the position where the imaging device 4 (external camera 4A) is mounted and the forward direction of the vehicle body, it is possible to easily determine whether the vehicle 2 enters a curved section of the lane without the need to calculate the curvature and the like based on the shape of the travel lane D.

Concrete embodiments of the present invention have been described in the foregoing, but the present invention is not limited to the above embodiments and may be modified or altered in various ways.

For example, in the above embodiment, the control device 7 controls the powertrain 3A, the brake device 3B, and the steering device 3C to make the vehicle 2 autonomously travel along the travel lane D, but the present invention is not limited to this embodiment. For example, the control device 7 may control only the steering device 3C to make the vehicle 2 autonomously travel along the travel lane D.

With regard to the above embodiment, description was made of the case where the vehicle 2 enters the curved section of the travel lane D from the straight section of the same but the above embodiment is also effective in other cases. For example, when the vehicle 2 is traveling along a gently curved lane, the adjustment (delaying) of the steering timing to correspond to the position of the yaw rotation axis X contributes to stabilizing the posture of the vehicle 2. Further, the above embodiment is also applicable when controlling the vehicle 2 to turn left or right at an intersection along a target route. At this time, the lane keeping planning unit 7B sets the timing at which steering of the vehicle 2 to turn left or right is performed (steering timing) such that the steering timing is delayed compared to when the vehicle 2 travels straight.

In the above embodiment, in step ST2, the delay time τ is set to the time obtained by dividing the distance L between the imaging device 4 and the yaw rotation axis X in the fore and aft direction of the vehicle body by the vehicle speed v, but the delay time τ is not limited to this embodiment. The delay time τ is only required to increase as the distance L between the position where the imaging device 4 is mounted and the yaw rotation axis X of the vehicle body in the fore and aft direction of the vehicle body increases. Thereby, the steering timing can be set to correspond to the position of the yaw rotation axis X, so that wobbling of the vehicle 2 can be prevented.

The travel control system 1 is not limited to the above embodiment and may have any configuration so long as it is configured such that, when the vehicle 2 has entered a curved section (a section having a curvature greater than or equal to a prescribed threshold value) of the travel lane D from a straight section of the same, the travel control system 1 delays the steering timing compared to when the vehicle 2 travels in the straight section.

More specifically, in another embodiment of the present invention, a travel control system 51 for a vehicle 2 equipped with a steering device 3C may include: an imaging device 4 mounted forward of the yaw rotation axis X of the vehicle 2 and configured to acquire images in the forward direction of the vehicle body; and a control device 7 configured to recognize the travel lane D on which the vehicle 2 is currently traveling from the acquired images, to calculate the angle Δθ formed between the direction of the travel lane D at the part of the vehicle where the imaging device 4 is mounted and the forward direction of the vehicle body (see FIG. 2), to acquire an angle Δθ' formed between the direction of the travel lane D at the yaw rotation axis X of the vehicle and the forward direction of the vehicle body by correcting the angle Δθ, and to feedback control the steering device 3C so as to make the angle Δθ' (namely, deviation) zero.

To make the above correction, the travel control system 51 may include a yaw rate sensor 52 (see FIG. 1) configured to acquire a yaw rate of the vehicle body, and the lane keeping planning unit 7B may use the vehicle speed and the yaw rate to estimate the shape of the travel lane D that will be detected a prescribed time later, and compare the estimation result and the shape of the travel lane D detected based on the images acquired by the imaging device 4 to estimate a true value of the inclination of the vehicle body relative to the travel lane D (the angle Δθ' formed between the direction of the travel lane D at the yaw rotation axis X and the forward direction of the vehicle body). An amount of lateral deviation of the vehicle 2 relative to the travel lane D and the like may also be estimated. At this time, in the estimation of the shape of the travel lane D, a known state estimating method using an observer, a Kalman filter or the like may be used.

With the above configuration, the steering angle is determined based on the angle Δθ' formed between the direction of the travel lane D at the part where the yaw rotation axis X is located and the forward direction of the vehicle body. Thus, when the vehicle 2 has entered the curved section from the straight section, during a period in which the imaging device 4 is in the curved section while the yaw rotation axis X is in the straight section and, the steering angle is not set to an angle for traveling along the curved section but is set to that angle once the yaw rotation axis X has entered the curved section. Thus, compared to the case where the steering device 3C is controlled based on the angle Δθ formed between the direction of the travel lane D at the position where the imaging device 4 is mounted and the forward direction of the vehicle body, the steering timing is delayed to better correspond to the position of the yaw rotation axis X.

In the above embodiment, the lane keeping planning unit 7B calculated the delay time τ by the formula τ=L/v, but the present invention is not limited to this embodiment. The lane keeping planning unit 7B may determine in step ST2 whether the vehicle 2 is in a high vehicle speed range (namely, L/v is smaller than a prescribed time threshold value τ0), such that if the determination result is Yes, the lane keeping planning unit 7B sets the delay time τ to zero in step ST3, and if the determination result is No, the lane keeping planning unit 7B calculates the delay time τ by the formula τ=L/v. In this case, the time threshold value τ0 may be determined based on an operation time τ1 from the start of steering to the completion of steering. With this configuration, it is possible to prevent the steering from being improperly delayed in the high vehicle speed range.

Also, in another embodiment, the lane keeping planning unit 7B may calculate the delay time τ in step ST2 by a formula τ=L/v−τ1; namely, in this embodiment, τ is smaller than in the above embodiment by the operation time τ1. Here, when L/v−τ1 becomes smaller than zero, the lane keeping planning unit 7B should set the delay time τ to zero in step ST2.

The invention claimed is:

1. A travel control system for a vehicle equipped with a steering device, the travel control system comprising:
    an imaging device configured to acquire images in front of a vehicle body of the vehicle;
    a vehicle speed sensor configured to detect a vehicle speed of the vehicle; and
    a control device configured to control the steering device, wherein the control device comprises:
    a travel lane detection unit configured to recognize a lane shape of a travel lane on which the vehicle is currently traveling from the images acquired by the imaging device;
    a lane keeping planning unit configured to set a steering timing for steering the vehicle such that the vehicle travels on the recognized travel lane; and
    a lane keeping execution unit configured to control the steering device to steer the vehicle at the steering timing set by the lane keeping planning unit,
    the lane keeping planning unit being configured to change the steering timing based on the recognized lane shape and the detected vehicle speed,
    wherein the imaging device is positioned forward of a yaw rotation axis of the vehicle body, and
    when the imaging device enters a curved section of the travel lane, the lane keeping planning unit delays the steering timing by a prescribed delay time compared to when the imaging device enters a straight section of the travel lane.

2. The travel control system according to claim 1, wherein the lane keeping planning unit is configured to set the steering timing such that a position in the vehicle where the imaging device is mounted passes a center of the travel lane.

3. The travel control system according to claim 1, wherein the lane keeping planning unit is configured to increase the delay time as a fore and aft distance between a position where the imaging device is mounted and the yaw rotation axis of the vehicle body increases.

4. The travel control system according to claim 3, wherein the lane keeping planning unit is configured to set the delay time at a value obtained by dividing the fore and aft distance between the position where the imaging device is mounted and the yaw rotation axis by the vehicle speed detected by the vehicle speed sensor.

5. The travel control system according to claim 1, wherein the lane keeping planning unit is configured to determine that the imaging device enters the curved section when an angle formed between a direction of the travel lane at a position where the imaging device is mounted and a forward direction of the vehicle is greater than or equal to a threshold value.

* * * * *